United States Patent [19]

Fredricks et al.

[11] Patent Number: 4,908,246

[45] Date of Patent: Mar. 13, 1990

[54] METALIZED MICROWAVE INTERACTIVE LAMINATE AND PROCESS FOR MECHANICALLY DEACTIVATING A SELECTED AREA OF MICROWAVE INTERACTIVE LAMINATE

[75] Inventors: Richard E. Fredricks; Michael A. Schmelzer, both of Appleton, Wis.

[73] Assignee: James River Corporation, Richmond, Va.

[21] Appl. No.: 148,483

[22] Filed: Jan. 26, 1988

[51] Int. Cl.⁴ .......................... B65D 1/00; B32B 15/04
[52] U.S. Cl. .................................. 428/34.1; 156/645; 428/35.8; 428/35.9; 428/461
[58] Field of Search ...................... 427/272; 156/659.1, 156/640, 645; 29/76.1; 428/461, 34.1, 35.9, 35.8

[56] References Cited

U.S. PATENT DOCUMENTS

| | | | |
|---|---|---|---|
| 1,431,917 | 10/1922 | Antaramian | 29/76.1 |
| 4,230,924 | 10/1980 | Brastad et al. | 219/10.55 E |
| 4,232,059 | 11/1980 | Proffitt | 427/272 |
| 4,267,420 | 5/1981 | Brastad | 219/10.55 E |
| 4,398,994 | 8/1983 | Beckett | 156/659.1 |
| 4,552,614 | 11/1985 | Beckett | 156/640 |
| 4,735,513 | 4/1988 | Watkins et al. | 428/35 XN |

*Primary Examiner*—Thomas J. Herbert
*Attorney, Agent, or Firm*—Finnegan, Henderson, Farabow, Garrett & Dunner

[57] ABSTRACT

A present invention provides a microwave interactive laminate and a process for brush deactivation of such a laminate. A film, coated with a microwave interactive layer is provided. A desired portion of the microwave interactive layer is coated with a mask layer and the entire assembly is then exposed to abrasion means. The coated and un-coated areas are subjected to the application of mechanical forces to form discontinuities in the microwave interactive layer. That portion of the microwave interactive layer that was coated remains interactive with microwave radiation and is a heating area while the un-coated area is deactivated.

8 Claims, 5 Drawing Sheets

METALIZED MICROWAVE INTERACTIVE LAMINATE AND PROCESS FOR MECHANICALLY DEACTIVATING A SELECTED AREA OF MICROWAVE INTERACTIVE LAMINATE

BACKGROUND

1. Field of the Invention

The present invention relates to a process for brush deactivation of the microwave interactive layer of a microwave interactive laminate to reduce or eliminate the capacity of the microwave interactive layer to generate heat in response to microwave energy. The present invention also relates to brush deactivated microwave interactive films and brush deactivated microwave interactive laminates which include a brush deactivated microwave interactive layer.

2. Background of the Invention

A characteristic of microwave cooking is that the exterior of foods cooked in a microwave oven, such as breads, do not have a brown or crisp texture desired by consumers. An objective of those concerned with microwave cooking has therefore been to provide ways of browning or crisping the exterior of foods cooked in a microwave oven.

One technique developed to brown or crisp the exterior of foods during microwave cooking has been the incorporation of a microwave interactive laminate into packages that contain foods. In response to microwave energy, a microwave interactive layer of the laminate generates heat which browns or crisps the surface of food.

Typically, a microwave interactive laminate includes a thin film which has a microwave interactive layer of lossy material deposited onto one side of the film. The layer of material generates heat in response to microwave energy. Film with a microwave interactive layer deposited on one side is a microwave interactive film.

To form a microwave interactive laminate, the microwave interactive film is commonly bonded to a substrate with the substrate serving as a support structure. The microwave interactive layer is disposed between the film and the substrate. The laminate may subsequently be cut into a shape that approximates the shape of a particular food product or the size of a particular package.

Commercially, a microwave interactive laminate can most conveniently be cut into rectangles for use in packages. When the food product which is being heated is circular, triangular or some other shape which does not conform to a rectangle, heat-generating areas of the microwave interactive laminate will not be covered by the food product. The exposed areas of conventional microwave interactive laminate can produce excessive heat which can scorch the food or the container. Also, the efficiency of the microwave interactive laminate is diminished when heat-generating areas are not covered by the food product since the exposed heat-generating areas absorb microwave radiation that would otherwise brown or crisp the food.

In addition, the heat-generating areas of a microwave interactive laminate can overlap each other when a package is assembled. A consequence of such an overlap is that excessive heat, which can scorch the package, is generated at the areas of overlap.

Finally, in packages where the microwave interactive laminate covers only a portion of a package or container, adhesive used to bond the microwave interactive laminate to the package or container can extend outside the area covered by the microwave interactive laminate. Adhesive outside the area of a package surface covered by the microwave interactive laminate can cause packages to stick together during production and handling.

U.S. Pat. Nos. 4,398,994 and 4,552,614 both to Beckett disclose continuous methods for forming decorative patterns of a metallized film and the use of such films in packaging. Both methods involve removing selected portions of a metal layer which has been deposited on a strip of polymer film. The '614 patent provides that the metallized surface is overprinted with an etchant-resistant material. The thus overprinted film is exposed to jets of aqueous etchant solution which is then washed. A scraper is provided to assist in the removal of etched metal and the spent etchant solution from the surface of the film.

While the foregoing apparatuses and methods of the prior art do succeed in producing a de-metalized film, they employ caustic chemicals in a complex washing and drying process. In addition, the methods and apparatus disclosed in the prior art apply to the producing of decorative metallized films, not to the production of microwave interactive laminates.

SUMMARY OF THE INVENTION

The present invention overcomes the problems and disadvantages of the prior art by providing a microwave interactive laminate wherein the microwave interactive layer in such a laminate has an area of any desired shape. Excessive heat generation caused by exposed or overlapping microwave interactive laminates can thus be avoided by the present invention. The microwave interactive laminate can be easily and inexpensively produced.

To achieve the objects and in accordance with the purpose of the invention, as embodied and broadly described herein, the microwave interactive film of this invention comprises: a film layer; and a microwave interactive layer deposited onto one side of the film layer having a heating area and a deactivated area, the deactivated area having discontinuities produced by application of mechanical forces whereby the capability of the deactivated area to generate heat in response to microwave energy has been reduced.

Further, to achieve the objects and in accordance with the purpose of the invention, as embodied and broadly described herein, a microwave interactive laminate of the present invention comprises: a microwave interactive film having a film layer and a microwave interactive layer deposited onto one side of the film layer, the microwave interactive layer having a heating area and a deactivated area, the deactivated area having discontinuities produced by abrasion, whereby the capability of the deactivated area to generate heat in response to microwave energy has been reduced; and a substrate layer bonded to the microwave interactive film to form a microwave interactive laminate, wherein the microwave interactive layer is between the film layer and the substrate layer.

A further embodiment of the present invention is a process for making a microwave interactive laminate having a substrate layer and a microwave interactive film, comprising: providing a microwave interactive film having a film layer and a microwave interactive layer deposited onto one side of the film layer; coating a selected area of said microwave interactive layer with a coating layer to form a coated area and an uncoated area; and abrading said coated area and the uncoated area, the uncoated area of the microwave interactive layer being sufficiently abraded to form discontinuities in the microwave interactive layer and convert the uncoated area into a deactivated area with reduced capability of generating heat in response to microwave energy and the coated area of the microwave interactive layer remaining microwave interactive.

Additional advantages and embodiments of the invention will be set forth in part in the description which follows, and in part will be apparent from the description, or may be learned by practice of the invention. The advantages of the invention may be realized and attained by processes, materials and combinations particularly pointed out in the appended claims.

DETAILED DESCRIPTION OF THE INVENTION

I. Microwave Interactive Film and Laminate

Figure 1:
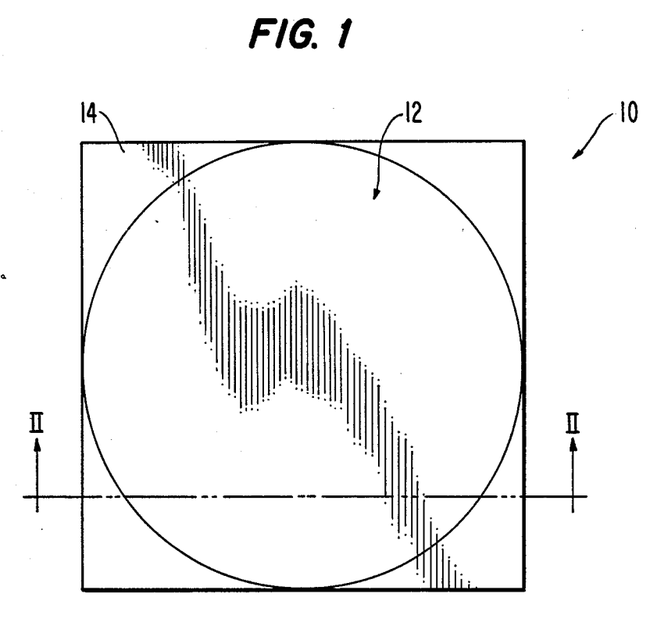
FIG. 1 is a top view of a microwave interactive laminate made in accordance with the present invention showing heating and deactivated areas.

One embodiment of the present invention, illustrated with reference to FIG. 1, is a microwave interactive laminate 10 having a heating area 12 and a deactivated area 14. Mechanical abrasion has reduced or eliminated the ability of a selected area of a microwave interactive layer (not shown in FIG. 1), corresponding to deactivated area 14, to generate heat in response to microwave energy. Only heating area 12 remains fully capable of generating heat in response to microwave energy without impairment since the area of the microwave interactive layer corresponding to heating area 12 has not been abraded.

In the embodiment of the invention illustrated in FIG. 1 the heating area 12 is circular to approximate the shape of a circular food product, such as a pizza. The food product will cover heating area 12 when the food is placed in a package into which the microwave interactive laminate 10 has been bonded. The area of the microwave interactive layer corresponding to heating area 12 will generate heat in response to microwave energy, preferably sufficient heat to brown or crisp the surface of food product placed in or on the package. While the heating area 12 of FIG. 1 is shown as being circular it should be understood that the present invention contemplates providing a heating area 12 of any desired shape, configuration and/or size.

The present invention is not limited by the location of the heating area in a package or container. The heating area of a laminate formed in accordance with the present invention could be disposed on any surface of a package or container where heat for browning or crisping the food is desired. The heating area may therefore be at the bottom interior surface, the top interior surface, vertical interior surfaces or top exterior surface of a container, depending on where the heat for browning or crisping food is desired and the kind of container involved.

Figure 2:
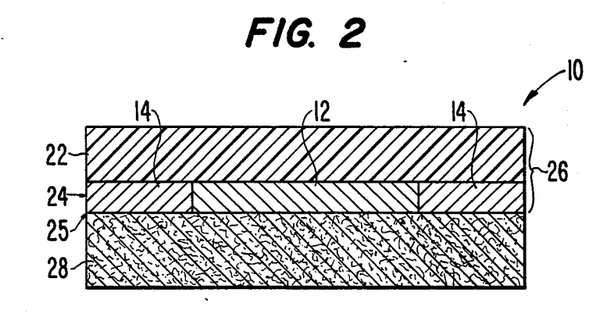
FIG. 2 is a cross sectional diagram of the microwave interactive laminate illustrated in FIG. 1 taken along line II—II.

FIG. 2 illustrates the layers making up microwave interactive laminate 10. It will be understood, of course, that the sizes of layers illustrated in FIG. 2 are exaggerated for purposes of illustration and are not necessarily in correct proportion to each other.

Film layer 22 is a heat tolerant and heat stable material. Immediately below film layer 22 is microwave interactive layer 24 which is a thin layer of material capable of generating heat in response to microwave energy, if it is not abraded to reduce or eliminate its ability to generate heat in response to microwave energy. In the embodiment illustrated in FIG. 2, a selected area of the microwave interactive layer has been abraded to form deactivated area 14. By converting the selected area into deactivated area 14 with abrasion in accordance with the present invention, the shape of heating area 12 can be precisely controlled. The microwave interactive layer 24 is usually vacuum vapor deposited onto one side of film layer 22 to form microwave interactive film 26 consisting of layers 22 and 24. Other processes for depositing microwave interactive layer 24 onto film layer 22, such as sputtering or transferring, may be used. Abrasion of the surface of the microwave interactive layer 24 corresponding to the inactive area 14 acts to convert that area of the microwave interactive layer 24 selected for abrasion into deactivated area 14. After the abrasion, the microwave interactive film 26, is bonded to substrate layer 28 with an appropriate adhesive disposed as an adhesive layer 25 between substrate layer 28 and microwave interactive film 26. Substrate layer 28 provides laminate 10 with structural rigidity and a fixed shape which conforms to the shape of a package into which the microwave interactive laminate 10 will be incorporated.

Figure 3A:
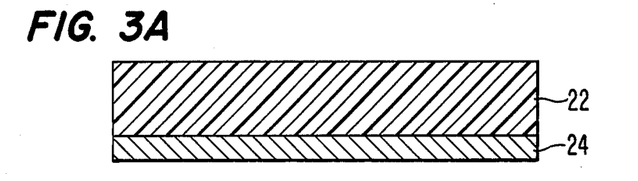
FIGS. 3A-3C illustrate the successive steps in the process of making the microwave interactive film of FIG. 2.
Figure 3B:
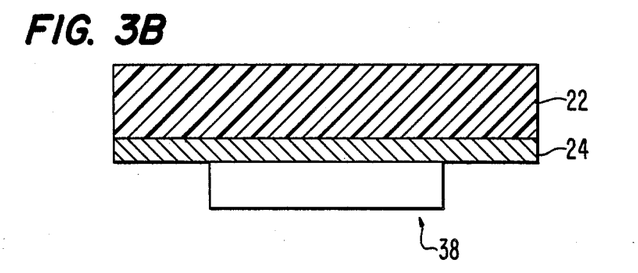
Figure 3C:
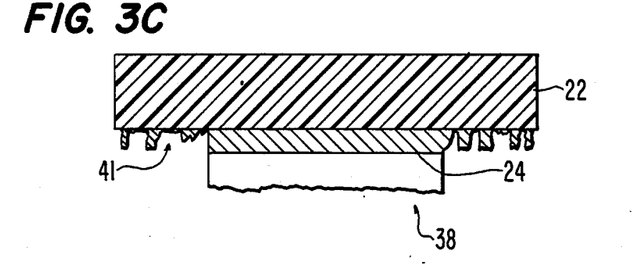

FIGS. 3A, 3B and 3C illustrate the manner in which the microwave interactive film 26 of FIG. 2 is produced. As shown in FIG. 3A a film layer 22 is provided and a microwave interactive layer 24 is deposited on it. FIG. 3B shows the microwave interactive film 26 with a coating layer 38 deposited on that portion of the microwave interactive layer 24 that is desired as a heating area. The coating layer 38 acts as a mask to protect the desired portion of the microwave interactive layer 24 from abrasion during the step of abrasion as illustrated in FIG. 3C. Suitable materials for the coating layer 38 are those useful for lamination such as binder resins or laminating adhesives.

As illustrated in FIG. 3C the coating layer 38 and that portion of the microwave interactive layer 24 not underlaying the coating layer has been mechanically abraded. As discussed in the Examples that follow a variety of coating layer material and mechanical abrasion device combinations can be used to accomplish the objects of the present invention. While FIG. 3C shows the coating layer 38 as having been substantially abraded some combinations of coating layer and abrasion device may produce an effect whereby the coating layer 38 is not abraded. To accomplish the objects of the present invention, however, the continuity of the microwave interactive layer 24 must be broken in those areas where an deactivated area is desired. FIG. 3C illustrates the manner in which the continuity of the microwave interactive layer 24 is broken in accordance with the present invention. In order to deactivate the metal layer it is necessary that continuity of the microwave interactive layer 24 be broken by removed areas 41 that extend to the film layer 22.

The film layer 22 serves as a stock material onto which microwave interactive layer 24 is deposited to form microwave interactive film 26 consisting of layers 22 and 24. Film layer 22 can also separate a food product resting on top of laminate 10 from the microwave interactive layer 24 or the substrate 28. The film layer 22 must be sufficiently stable at high temperatures when laminated to substrate layer 28 so that it will not degrade during the operation of a microwave oven at temperatures selected for cooking the desired food. Suitable materials for use as a film layer include, but are not limited to, films such as polyesters, polyolefins, nylon, cellophane, polysulphone, biaxially oriented polyester and other relatively stable plastics. It has been found that biaxially oriented polyester is a preferred material for most food containers because of its heat stability and its surface smoothness.

The microwave interactive layer 24 is preferably deposited onto one side of film layer 22 by a vacuum vapor deposition technique. The side of film layer 22 onto which the microwave interactive material is deposited will face away from the food product in a container. Sputtering, transferring or other techniques, which are known to those skilled in the art, may also be used to deposit a layer of lossy material which interacts with microwave energy onto one side of protective film 22.

Any suitable lossy substance that will heat in a microwave oven can be used as the microwave interactive material. These materials fall primarily into four groups: conductors, semi-conductors, ferromagnetic materials and dielectic materials. Any of these materials which convert microwave radiation into heat energy may be used in the present invention. Preferred microwave interactive materials used in the present invention to form microwave interactive layer 24 are compositions containing metals or other materials such as aluminum, iron, nickel, copper, silver, carbon, stainless steel, nichrome, magnetite, zinc, tin, iron, tungsten and titanium. These materials may be used in a powder, flake or fine particle form. The microwave interactive materials can be used alone or in combination with each other. The most preferred material for many applications of the present invention is aluminum metal.

The microwave interactive layer 24 is very thin. In general, the thickness of vacuum vapor deposited layers of electrically conductive material is measured in terms of the optical density of the conductive layer itself. Microwave interactive layers used in microwave cooking are so thin that after they are deposited on transparent film, the microwave interactive film made up of film layer 22 and microwave interactive layer 24 may be seen through by the human eye.

The substrate layer 28 may be made of a variety of materials but is preferably formed of a low density material having a relatively high insulating capacity and a heat stability sufficient to withstand cooking temperatures in a microwave oven. Suitable substrate materials include, but are not limited to, paperboard, papers, plastics, plastic films, ceramics and a wide variety of composite materials such as fiber/polymer composites. A preferred material for use in disposable packages for prepared foods is paperboard.

A process, illustrated with reference to FIG. 4, used to make microwave interactive laminates in accordance with the present invention, may be conducted by first providing a continuous roll of microwave interactive film 26 comprising film layer 22 and microwave interactive layer 24. As explained above, microwave interactive film 26 can be formed by depositing microwave interactive material in a layer onto one side of the film.

Next, a mask coating layer 38 is deposited on the microwave interactive layer 24 over that area in which microwave interactivity is desired to be maintained. The printed pattern can include very fine detail, including the printing of instructions, information or decoration.

Conventional printing techniques such as rotogravure, flexography or lithography may be used to coat the selected area of the microwave interactive layer with the coating layer 38. The printing techniques used may be conducted with equipment which is well known to those of ordinary skill in the art. Flexographic printing, however, is preferred for many applications of the present invention.

Figure 4:
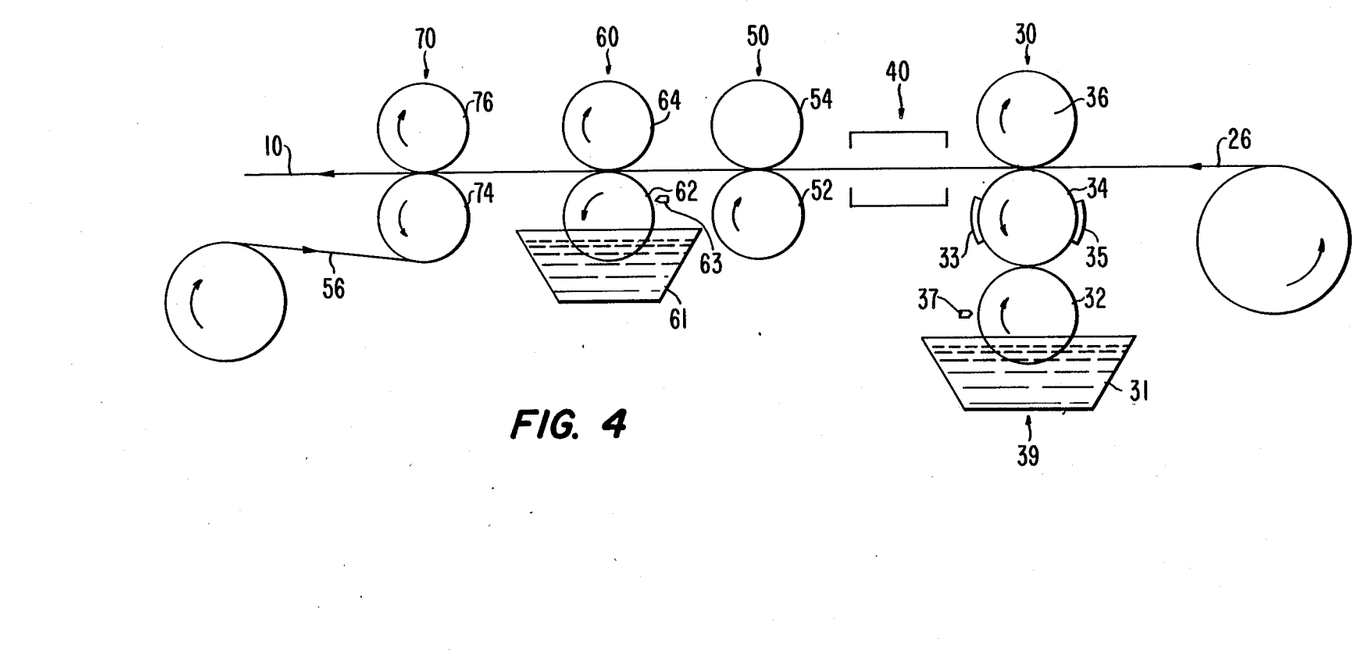
FIG. 4 is a schematic representation of apparatus which may be used to abrade a microwave interactive layer in accordance with the present invention.

As embodied herein, the coating operation is carried out at the coating station 30 as shown in FIG. 4. The coating 31 used for the coating layer 38 is contained in a recepticle 39. The surface of a roller 32 is coated by rotating it through the coating 31 in the recepticle 39. The thickness of the coating 31 that clings to the surface of the roller 32 is controlled by roller 32 and a doctor blade 37. A printing roller 34 is provided that rotates in a direction counter to that of the roller 32. The printing roller 34 carries on its surface one or more printing plates, such as, for example, plates 33 and 35. The printing plates 33 and 35 are brought into rotating contact with the coating 31 clinging to the counter-rotating surface roller 32 to transfer the coating 31 to the printing plates 33 and 35. The printing plates 33 and 35 then continue to rotate until they contact the microwave interactive film 26 to transfer the coating 31 from the plate to the film. In this way, the image formed on the printing plates 33 and 35 can be transferred to the microwave interactive film 26. The roller 36 is disposed opposite the film 26 from the printing roller 34 to ensure that sufficient pressure is brought to bear between the film 26 and the printing plates 33 and 35 to transfer the coating 31 to the film 26.

It should be noted that deactivated area 14 of the microwave interactive layer 24 need not be visibly scratched to be deactivated. Accordingly, a colored coating 31 for use in the coating layer 38 can be used to provide a visual indication of the demarcation between deactivated area 14 and heating areas 12 of the microwave interactive layer 24 in applications of the present invention wherein the deactivated area 14 is deactivated without being visibly scratched.

After the coating layer 38 has been printed onto the microwave interactive layer, the coating layer 38 and the microwave interactive film is dried at drying station 40 with any conventional drier or driers, such as hot air driers, infrared heating driers, or internally heated rolls.

The thus-coated film is then abraded at station 50. As embodied herein, this abrasion is accomplished by bringing a rotating brush 52 into contact with the microwave interactive film 26 opposite roller 54. The brush 52 rotates so that its bristles move relative to the film 26. The brush 52, coating layer 38, and microwave interactive layer 24 are selected in the manner explained in reference to FIGS. 3B and 3C such that the coating layer is not fully removed by the brush action and the microwave interactive layer 24 is abraded by the action of the brush sufficiently to produce dicontinuities in it to reduce or eliminate its microwave interactive qualities. It should be understood that, depending on the coating layer 38 and the microwave interactive film 26 chosen, it will be sufficient to move the coated microwave interactive film over a stationary surface to sufficiently abrade the un-coated area of the microwave interactive film 26 to de-activate it.

The abrasion of the microwave interactive film 26 sufficiently to cause deactivation is dependent upon several factors including: the abrasion device chosen, such as a brush or a metal cylinder; the force with which the abrasion device is exerted against the microwave interactive film 26; and the speed at which the abrasion device moves relative to the microwave interactive film.

Adhesive 61 is preferably applied to the treated microwave interactive film 26 at station 60 by equipment illustrated by rollers 62 and 64. The thickness of the adhesive layer is controlled by roller 62 and a doctor blade 63. The adhesive 61, however, may be applied to substrate 56 rather than, or in addition to, the treated microwave interactive film 26. A variety of adhesives may be used to bond the microwave interactive film to the substrate. Adhesives found useful in the present invention include water based acrylic emulsions and casein neoprene emulsions.

After adhesive has been applied, the treated microwave interactive film 26 can be continuously bonded to substrate 56 at station 70 by equipment illustrated by rollers 74 and 76 to form microwave interactive laminate 10 of the present invention. Although the process as depicted shows in-line lamination, the invention does not preclude separate stages of treating and out-of-line lamination.

Preferably, only selected areas of the microwave interactive layer have been deactivated by abrading, forming a shaped heating area, such as heating area 12 illustrated in FIGS. 1 and 2. The heating area may generally conform to the shape of the food product to be placed in a package. By selecting the area or areas of the microwave interactive layer which are mechanically abraded, it is possible to control the shape of the heating area. This control over the shape of the heating area can be used to prevent overlap of heat-generating areas of a laminate used in assembled packages, to provide heat generating areas of laminate that are fully covered by a food product, and/or to form a printed message or decoration.

The microwave interactive film and the process of making it in accordance with the present invention are further illustrated with the following examples.

Example 1

A mask coating layer 38 comprising acrylic adhesive was applied to the metal side of an aluminum metalized polyester. The coating rate was 0.9 lb/ream. The brush used was a swine bristle brush, 1½ inches in diameter driven by an electric drill at 1300 rpm. The brush rotated in a direction opposite to its direction of travel over the microwave interactive film. The bristles had nominal diameters in the range of 0.005 to 0.006 inches. A section of the sample was microwaved at 600 watts for 5 seconds. In the heating area, where heating was desired, the polyester was destroyed - indicating that the desired heating had been achieved. The remaining intact polyester corresponding to the deactivated area, indicated minimal or no heating.

EXAMPLE 2

The same materials and conditions as followed in Example 1 were followed in Example 2 with the exception that a ¾" diameter brush with swine bristles having nominal diameters in the range of 0.007-0.008 being used. Again, the desired results were obtained since the inactivation of the unmasked portion of the microwave interactive layer was achieved while the masked portion retained its microwave interactive qualities.

EXAMPLES 3-6

In these examples the same mask coating layer 38 was used as in Example 1. The brushes used were as set forth in the following table:

| Example | Brush Material | Brush Diam. | Bristle Diam. |
| --- | --- | --- | --- |
| 3 | Stainless Steel | 1 in. | .005 |
| 4 | Stainless Steel | 1 in. | .003 |
| 5 | Brass | 1 in. | .005 |
| 6 | Brass | 1 in. | .003 |

In each of examples 3-6 the brush did not perform satisfactorially as it was too stiff and abraded the mask coating layer and the underlying microwave interactive layer. Thus the microwave interactive layer underlying the mask coating layer was deactivated.

| | Examples 7-10 | |
| --- | --- | --- |
| Example | Brush Diameter | Nominal Bristle Diameter |
| 7 | 1.5 | 0.010 |
| 8 | 1.0 | 0.006 |
| 9 | 1.0 | 0.0035 |
| 10 | 4.0 | 0.0035 |

In each of examples 7-10 the methodology of example 1 was followed whereby the brushes were driven at 1300 rpm by an electric drill and rotated in a direction opposite to the brush's direction of travel across the microwave interactive film. No mask coating layer was used in these examples. Both examples 7 and 8 were sufficiently abraded in the brushed areas to deactivate the microwave interactive film. Example 9 exhibited only slight scratching in the brushed area and approximately 20% of its surface area was deactivated. Example 10 exhibited faint scratching and approximately 5% of its brushed area was deactivated.

EXAMPLE 11

The technique of example 1 was followed using a mask coating layer 38 of ink binder WBB-17592, available from CZ Ink, Co., of St. Louis, Missouri. The ink binder was applied by flexography in a suitable pattern. A 3 ¾" diameter horsehair brush with ½" bristle extension was applied at 390 RPM counter-rotating to the direction of travel of the web travelling at 50 ft/min. The metalized film was thoroughly scratched while the masked area was protected. The protected or coated area was microwave interactive while that area that was uncoated was deactivated.

EXAMPLE 12

The technique of Example 1 was followed using a mask coating layer 38 of human skin oil (squalene). A 1 ½ swine bristle brush was used. The surface covered with squalene was protected from abrasion.

This example illustrates how the present invention can be used to provide a permanent record of a print of human skin such as a handprint, a fingerprint, or the like. Such a print can be produced by pressing, for example, a finger against a metallized film. Squalene will be deposited on the film in those areas where the finger contacted the film. The film is then mechanically abraded and those areas coated with squalene will not be abraded thus producing a permanent record of the fingerprint.

II. A CONTAINER INCORPORATING A MICROWAVE INTERACTIVE FILM OR LAMINATE

Because the microwave interactive layer or laminates formed in accordance with the present invention generate heat only at the area or areas selected as the heating area or areas, the microwave interactive laminate does not have to be cut to the approximate shape of the food product prior to bonding to a package. This can lower package production time, complexity and cost. Moreover, the control provided by the present invention over the shape of the heating area can be used to provide areas of heat-generating microwave interactive laminate where it is desired for a particular end use. In addition, overlap between heat-generating microwave interactive layers, which can ocur when a package or container is assembled, can be avoided by deactivating selected areas of the microwave interactive layer that will overlap when the package or container is assembled.

A variety of improved packages or containers can incorporate microwave interactive laminates made in accordance with the present invention. With the present invention, for instance, pizza packages or pizza trays may be provided with a microwave interactive laminate having all areas of the microwave interactive layer of the laminate, which are not to be covered by the pizza, deactivated. This focuses the heat from the microwave interactive layer where it is needed to brown and crisp the pizza crust.

Figure 5:
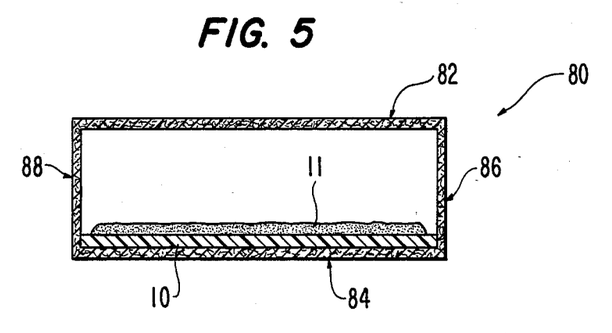
FIG. 5 is a side cross-sectional view of a first embodiment of a container including a microwave interactive laminate in accordance with the present invention.

In accordance with the present invention a container is provided for storing, supporting and microwave cooking food. The container includes a package having a surface or surfaces for enclosing and/or supporting a food product and a microwave interactive laminate, as, for example, shown in FIG. 2, that forms the surface or surfaces of the package to heat the food product in response to microwave energy. As embodied herein such a container 80, as shown in FIG. 5 includes a top surface 82, a bottom surface 84, a first side surface 86 and a second side surface 88. The microwave interactive laminate 10 is bonded in any convenient manner to the bottom surface 84. As shown in FIG. 5 a food product 11 is placed on the microwave interactive laminate 10. Alternatively, the food product 11 may be placed directly n the bottom surface 84 and the microwave interactive laminate 10 may be bonded to the top surface 82 or to the first and second side surfaces 86 and 88, respectively.

Packages made with the microwave interactive film integral to all of the interior vertical surfaces may have ends of the vertical surfaces which form tabs or flaps which overlap the ends of adjacent vertical surface when the package is assembled. The overlapping tabs or flaps can result in overlapping areas of the microwave interactive layer 26 of the laminate. The overlapping areas of the microwave interactive layer generate excessive heat which can result in scorching. Other package constructions, of course, can result in overlapping layers of microwave interactive layers. In some packages, for instance, overlapping occurs at glued seams or on dust flaps. Again, excessive heat is generated at the areas of overlap. The overlap problem can be avoided with the present invention by deactivating selected areas of the microwave interactive layer 26 of the laminate which will overlap each other when the package is assembled.

Figure 6:
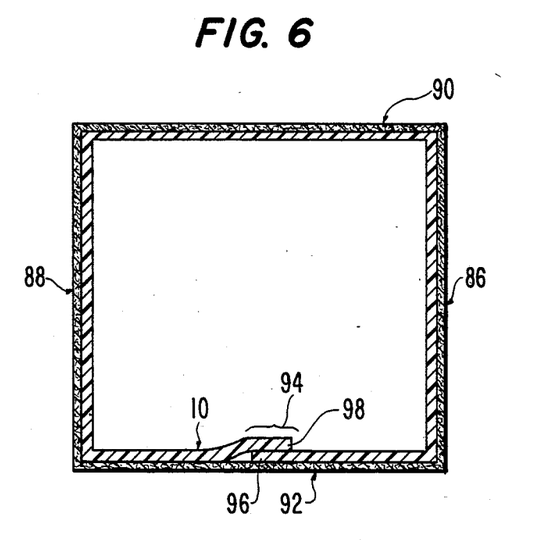
FIG. 6 is a top cross-sectional view of a second embodiment of a container including a microwave interactive laminate in accordance with the present invention.

In accordance with the present invention the container shown in FIG. 6 has deactivated areas of microwave interactive layer that correspond to areas of the package wherein the microwave interactive layers overlap when the package is assembled. As embodied herein, the microwave interactive laminate 10 is bonded to the sides 86, 88, 90, and 92 of the container. The microwave interactive laminate 10 includes a first end 96 and a second end 98 that overlap to form an overlap portion 94. That portion of the first end 96 of the microwave interactive laminate 10 that overlaps with the second end 98 in the overlap portion 94 is deactivated in the manner described in reference to FIGS. 3A-3C.

Also as embodied herein a container in accordance with the present invention is provided wherein the microwave interactive laminate forms the structure of the container.

Figure 7:
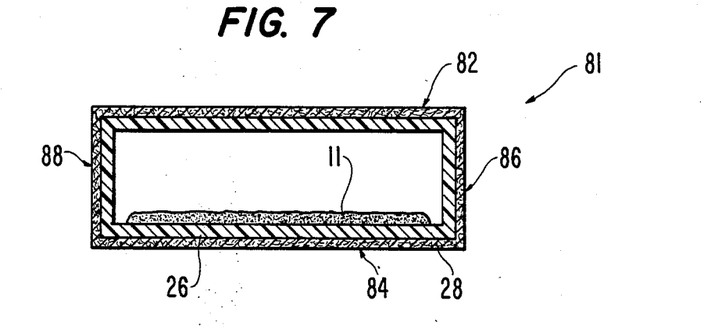
FIG. 7 is a side cross-sectional view of a first embodiment of a container formed from a microwave interactive laminate in accordance with the present invention.
Figure 8:
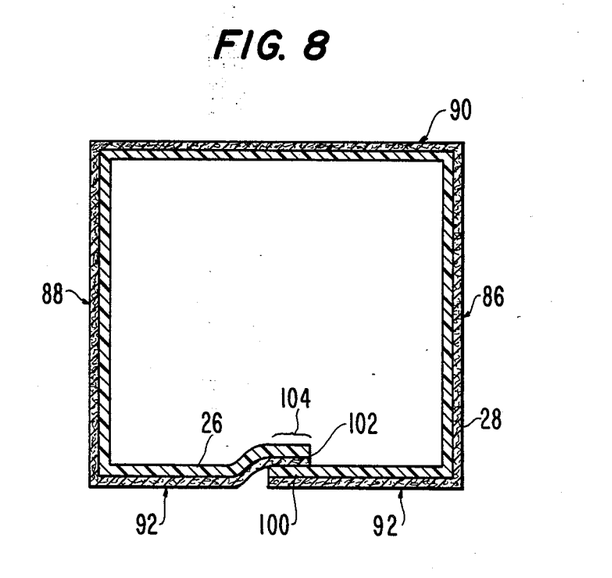
FIG. 8 is a top cross-sectional view of a second embodiment of a container formed from a microwave interactive laminate in accordance with the present invention.

As shown in FIGS. 7 and 8 a container 81 is formed having the microwave interactive laminate 10, including the microwave interactive layer 26 and the substrate layer 28. In the embodiment of FIG. 5 food 11 is disposed on the bottom surface 84. Accordingly, the microwave interactive film 26 corresponding to the bottom surface 84 is microwave interactive, while the remaining surfaces 82, 86 and 88 are deactivated.

As shown in FIG. 8, the microwave interactive laminate 10, including the microwave interactive layer 26 and the substrate layer 28, forms the sides 86, 88, 90 and 92 of the container. The microwave interactive laminate has a first end 100 and a second end 102 that overlap to form an overlap portion 104. That portion of the first end 100 of the microwave interactive laminate 10 that overlaps with the second end 102 in the overlap portion 104 has a microwave layer 26 that is deactivated.

It is also sometimes desirable to provide pressed trays and plates which are not microwave interactive at the brim, sides or selected areas of the bottom of a tray or plate for performance or handling reasons. With the present invention, pressed trays and plates can be provided with a microwave interactive laminate in which deactivated areas of the microwave interactive layer correspond only to areas at which heating is not desired.

In addition, portions of the microwave interactive layer may be deactivated to provide a grid pattern of alternating discrete activated and deactivated areas. This grid pattern decreases the amount of heat that will be generated over the grid area as a whole.

It will be apparent to those skilled in the art that various modifications and variations can be made in the products and processes of the present invention without departing from the scope or spirit of the invention. For example, the present invention discusses the abrasion of a microwave interactive film 26 to deactivate it. It should be understood, however, that to deactivate a microwave interactive film 26 in accordance with the present invention, one need only cause minute discontinuities in the microwave interactive layer 24 that may or may not be visible to the unaided eye. Such discontinuities 39 can be formed by abrasion in the conventional sense or through abrasion by drawing the microwave interactive film 26 over a surface, such as, for example, a metal cylinder. Thus, it is intended that the present invention cover modifications and variations thereof provided they come within the scope of the appended claims and their equivalents.

What is claimed is:

1. A container for storing, supporting and microwave cooking food, comprising:
   (a) a package having a surface or surfaces for enclosing and/or supporting a food product; and
   (b) a microwave interactive laminate forming said surface or surfaces to heat said food product in response to microwave energy including:
      (i) a microwave interactive film having a film layer and a microwave interactive layer disposed on one side of said film layer, said microwave interactive layer having a heating area and a deactivated area, said deactivated area having discontinuities produced by abrasion, whereby the capability of said deactivated area to generate heat in response to microwave energy has been reduced; and
      (ii) a substrate layer bonded to said microwave interactive film to form a microwave interactive laminate, wherein said microwave interactive layer is disposed between said film layer and said substrate layer.

2. A container as defined in claim 1 wherein said microwave interactive laminate forms interior vertical surfaces of said container.

3. A container as defined in claim 1 wherein said microwave interactive laminate forms a surface of said package which will support said food product.

4. A container as defined in claim 1 wherein said microwave interactive laminate forms a surface of said package which will be above said food product.

5. A container as defined in claim 1 wherein said deactivated areas of said microwave interactive layer correspond to areas of said package wherein said deactivated areas of said microwave interactive layers overlap when said package is assembled.

6. A container as defined in claim 1 wherein said heating area of said microwave interactive layer is circular.

7. A container as defined in claim 1 wherein said heating area includes a grid of heating areas and deactivated areas.

8. A container for storing, supporting and microwave cooking food, comprising:
   (a) a package having a surface or surfaces for enclosing and/or supporting a food product; and
   (b) a microwave interactive laminate bonded to said surface or surfaces to heat said food product in response to microwave energy including:
      (i) a microwave interactive film having a film layer and a microwave interactive layer disposed on one side of said film layer, said microwave interactive layer having a heating area and a deactivated area, said deactivated area having discontinuities produced by abrasion, whereby the capability of said deactivated area to generate heat in response to microwave energy has been reduced; and
      (ii) a substrate layer bonded to said microwave interactive film to form a microwave interactive laminate, wherein said microwave interactive layer is disposed between said film layer and said substrate layer.

* * * * *